(12) United States Patent
Joho et al.

(10) Patent No.: US 10,223,726 B2
(45) Date of Patent: Mar. 5, 2019

(54) INFORMATION PROVISIONING DEVICE, METHOD, AND MEDIUM FOR EVALUATING AND ESTIMATING GIFT CANDIDATES

(71) Applicant: Rakuten, Inc., Shinagawa-ku, Tokyo (JP)

(72) Inventors: Koji Joho, Shinagawa-ku (JP); Shotaro Kamio, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 632 days.

(21) Appl. No.: 14/364,909

(22) PCT Filed: Sep. 25, 2012

(86) PCT No.: PCT/JP2012/074540
§ 371 (c)(1),
(2) Date: Jun. 12, 2014

(87) PCT Pub. No.: WO2013/145380
PCT Pub. Date: Oct. 3, 2013

(65) Prior Publication Data
US 2014/0337166 A1    Nov. 13, 2014

(30) Foreign Application Priority Data
Mar. 30, 2012    (JP) ................................. 2012-080364

(51) Int. Cl.
*G06Q 30/00* (2012.01)
*G06Q 30/06* (2012.01)
*G06F 17/30* (2006.01)

(52) U.S. Cl.
CPC ... *G06Q 30/0631* (2013.01); *G06F 17/30699* (2013.01); *G06F 17/30867* (2013.01); *G06Q 30/0601* (2013.01); *G06Q 30/0641* (2013.01)

(58) Field of Classification Search
CPC ........... G06Q 30/06; G06Q 30/0601–30/0643; G06Q 30/08
See application file for complete search history.

(56) References Cited

U.S. PATENT DOCUMENTS 8,280,781 B1 * 10/2012 Pottier ............... G06Q 30/0601
705/26.8
2002/0023009 A1    2/2002 Ikeda
(Continued)

FOREIGN PATENT DOCUMENTS

JP    11-3375 A    1/1999
JP    20027752 A    1/2002
(Continued)

OTHER PUBLICATIONS

The Act of Giving Makes a Nice Gift, if Done Correctly. Alina Tugend. Dec 10, 2005. [http://www.nytimes.com/2005/12/10/business/the-act-of-giving-makes-a-nice-gift-if-done-correctly.html?_r=0].*
(Continued)

*Primary Examiner* — William J Allen
(74) *Attorney, Agent, or Firm* — Sughrue Mion, PLLC

(57) ABSTRACT

An information provision device according to one embodiment includes an evaluation request unit, an evaluation registration unit, an estimation unit and a presentation unit. The evaluation request unit transmits an evaluation interface for a recipient to evaluate a given gift given to the recipient to a recipient terminal. The evaluation registration unit stores an entered evaluation as evaluation information into an evaluation storage unit. When a next giver gives a next gift to the recipient through a giver terminal, the estimation unit estimates candidate items for the next gift at least from given gifts based on evaluations indicated by the evaluation information corresponding to the recipient. The presentation unit transmits candidate information indicating the estimated candidate items to the giver terminal and thereby presents the candidate items to the next giver.

11 Claims, 16 Drawing Sheets

(56) References Cited

U.S. PATENT DOCUMENTS

| | | | | |
|---|---|---|---|---|
| 2007/0143189 A1* | 6/2007 | Mitchem | ............... | G06Q 30/06 |
| | | | | 705/26.1 |
| 2009/0234755 A1* | 9/2009 | Sidoruk | ............... | G06Q 30/02 |
| | | | | 705/26.1 |
| 2010/0280913 A1* | 11/2010 | O'Sullivan | ............ | G06Q 30/02 |
| 2012/0209748 A1* | 8/2012 | Small | .................... | G06Q 30/06 |
| | | | | 705/27.1 |
| 2013/0211954 A1* | 8/2013 | Linden | .............. | G06Q 30/0621 |
| | | | | 705/26.8 |

FOREIGN PATENT DOCUMENTS

| | | | |
|---|---|---|---|
| JP | 2002312645 A | 10/2002 | |
| JP | 2006285362 A | 10/2006 | |
| JP | 2007-213429 * | 8/2007 | ............ G06Q 50/00 |
| JP | 2007213429 A | 8/2007 | |
| JP | 2010128509 A | 6/2010 | |
| JP | 2010204862 A | 9/2010 | |
| WO | 03030045 A | 4/2003 | |

OTHER PUBLICATIONS

English Translation of International Preliminary Report on Patentability dated Oct. 9, 2014 issued in Patent Application No. PCT/JP2012/074540.

Japanese Office Action dated Aug. 13, 2013 issued in Patent Application No. P2012080364.

International Search Report dated Oct. 23, 2012 issued in Patent Application No. PCT/JP2012/074540.

* cited by examiner

Fig.2

| SHOP ID | ITEM ID | ITEM NAME | PRICE | IMAGE DATA | ITEM URL | QUANTITY OF STOCK | ITEM CATEGORY | URL | ... |
|---|---|---|---|---|---|---|---|---|---|
| S001 | T001 | ITEM A | ¥45000 | ... | ... | ... | ... | ... | ... |
| | T002 | ITEM B | ¥25000 | ... | ... | ... | ... | ... | ... |
| | T003 | ITEM C | ¥10000 | ... | ... | ... | ... | ... | ... |
| | T004 | ... | ... | ... | ... | ... | ... | ... | ... |
| | ... | ... | ... | ... | ... | ... | ... | ... | ... |
| S002 | ... | ... | ... | ... | ... | ... | ... | ... | ... |
| ... | ... | ... | ... | ... | ... | ... | ... | ... | ... |

| USER ID | NAME | ADDRESS | TELEPHONE NUMBER | EMAIL ADDRESS | ... |
|---------|------|---------|------------------|---------------|-----|
| U001 | ... | ... | ... | ... | ... |
| U002 | ... | ... | ... | ... | ... |
| ... | ... | ... | ... | ... | ... |

| PURCHASE ID | GIVER ID (USER ID) | RECIPIENT ID (USER ID) | PURCHASE DATE AND TIME | GIFT ID (ITEM ID) | PURCHASE QUANTITY | EVALUATION |
|---|---|---|---|---|---|---|
| P001 | U001 | U101 | ... | T001 | 1 | ... |
| P002 | U002 | U102 | ... | T101 | 1 | ... |
|  |  |  |  | T103 | 2 | ... |
| P003 | U001 | U002 | ... | T005 | 2 | ... |
| ... | ... | ... | ... | ... | ... | ... |

| USER ID | COMBINATION OF ITEMS | DEGREE OF ASSOCIATION |
|---|---|---|
| U001 | BEER, CHEESE | 0.5 |
| | BEER, PEANUTS | 0.7 |
| | BAT, GLOVE | 0.3 |
| | ... | ... |
| U002 | BEER, CHEESE | 0.8 |
| | BEER, PEANUTS | 0.3 |
| | BAT, GLOVE | 0.5 |
| | ... | ... |
| ... | ... | ... |

GIVEN ITEMS WAS

● GOOD   ○ BAD

SEND (b)

GIVEN ITEMS WAS

GOOD                    BAD
○ 5  ○ 4  ● 3  ○ 2  ○ 1

SEND

Fig.13
GIVEN ITEMS WAS
◉ GOOD    ◯ BAD
Which is the item you wanted with the given item?
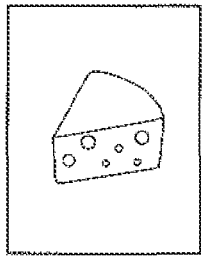 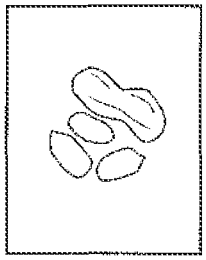 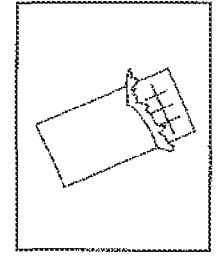
  
SEND

INFORMATION PROVISIONING DEVICE, METHOD, AND MEDIUM FOR EVALUATING AND ESTIMATING GIFT CANDIDATES

CROSS REFERENCE TO RELATED APPLICATIONS

This application is a National Stage of International Application No. PCT/JP2012/074540, filed on Sep. 25, 2012, which claims priority from Japanese Patent Application No. 2012-080364, filed on Mar. 30, 2012, the contents of all of which are incorporated herein by reference in their entirety.

TECHNICAL FIELD

One embodiment of the present invention relates to a device, a method, a program and a recording medium for providing reference information related to a gift to a user (giver) who intends to give a gift to another person.

BACKGROUND ART

Schemes that give a gift to another person through an online system are known. For example, in Patent Literature 1 below, an online gift method that allows selecting and giving a gift item based on personal attribute information (name, address, interest, family structure etc.) of a registered recipient is disclosed.

CITATION LIST

Patent Literature

PTL 1: JP 2002-7752 A

SUMMARY OF INVENTION

Technical Problem

However, in the above scheme, there is no way to know whether the recipient was pleased at the gift or not. Although the method disclosed in Patent Literature 1 allows selecting a gift item using reference information such as the name, address, interest, family structure and the like of a recipient, persons with the same name, address, interest and family structure are not necessarily pleased at the same gift. Therefore, a scheme that allows a giver to select a gift which a recipient likes more reliably is demanded.

Solution to Problem

An information provision device according to one aspect of the present invention includes an evaluation request unit configured to transmit an evaluation interface for a recipient to evaluate a given gift given to the recipient to a recipient terminal, an evaluation registration unit configured to store an evaluation entered through the evaluation interface as evaluation information into an evaluation storage unit, the evaluation information containing the recipient, the given gift and the evaluation of the given gift in association with one another, an estimation unit configured to, when a next giver gives a next gift to the recipient through a giver terminal, estimate candidate items for the next gift at least from given gifts based on evaluations indicated by the evaluation information corresponding to the recipient, and a presentation unit configured to transmit candidate information indicating the candidate items estimated by the estimation unit to the giver terminal and thereby present the candidate items to the next giver.

An information provision method according to one aspect of the present invention is an information provision method executed by an information provision device, the method including an evaluation request step of transmitting an evaluation interface for a recipient to evaluate the given gift given to the recipient to a recipient terminal, an evaluation registration step of storing an evaluation entered through the evaluation interface as evaluation information into an evaluation storage unit, the evaluation information containing the recipient, the given gift and the evaluation of the given gift in association with one another, an estimation step of, when a next giver gives a next gift to the recipient through a giver terminal, estimating candidate items for the next gift at least from given gifts based on evaluations indicated by the evaluation information corresponding to the recipient, and a presentation step of transmitting candidate information indicating the candidate items estimated in the estimation step to the giver terminal and thereby presenting the candidate items to the next giver.

An information provision program according to one aspect of the present invention causes a computer to implement an evaluation request unit configured to transmit an evaluation interface for a recipient to evaluate a given gift given to the recipient to a recipient terminal, an evaluation registration unit configured to store an evaluation entered through the evaluation interface as evaluation information into an evaluation storage unit, the evaluation information containing the recipient, the given gift and the evaluation of the given gift in association with one another, an estimation unit configured to, when a next giver gives a next gift to the recipient through a giver terminal, estimate candidate items for the next gift at least from given gifts based on evaluations indicated by the evaluation information corresponding to the recipient, and a presentation unit configured to transmit candidate information indicating the candidate items estimated by the estimation unit to the giver terminal and thereby present the candidate items to the next giver.

A computer-readable recording medium according to one aspect of the present invention stores an information provision program that causes a computer to implement an evaluation request unit configured to transmit an evaluation interface for a recipient to evaluate a given gift given to the recipient to a recipient terminal, an evaluation registration unit configured to store an evaluation entered through the evaluation interface as evaluation information into an evaluation storage unit, the evaluation information containing the recipient, the given gift and the evaluation of the given gift in association with one another, an estimation unit configured to, when a next giver gives a next gift to the recipient through a giver terminal, estimate candidate items for the next gift at least from given gifts based on evaluations indicated by the evaluation information corresponding to the recipient, and a presentation unit configured to transmit candidate information indicating the candidate items estimated by the estimation unit to the giver terminal and thereby present the candidate items to the next giver.

According to the above aspects, when gift giving is done, a recipient evaluates the gift (given gift), and the evaluation is recorded as evaluation information. After that, when the next giver intends to give a new gift (next gift) to the same recipient, candidate items for a new gift are estimated from the gifts that have been given in the past based on the evaluation, and the items are presented to the next giver. In this manner, by estimating gift candidates based on the evaluations of gifts by the recipient, the probability that the next giver selects a gift which the recipient likes increases. Further, because the evaluation information corresponds to the gift that has been actually given, gift candidates are estimated based on reliable information without depending on the personal information of the recipient. It is thereby possible to more reliably allow the giver to select a gift which the recipient likes and enhance the degree of satisfaction of the recipient.

In the information provision device according to another aspect, the estimation unit may sort one or more given gifts into a high priority item and a low priority item at least based on an evaluation value obtained from the evaluation, the given gift sorted as the high priority item may satisfy a condition that the evaluation value is equal to or more than a specified threshold, the given gift sorted as the low priority item may include a gift where the evaluation value is less than the threshold, and the high priority item may be presented to the next giver in preference to the low priority item. In this manner, by sorting the gifts given in the past into a group of items that have received evaluations of a certain standard or higher (high priority items) and a group including items that do not meet the standard (low priority items), it is possible to present candidates for a gift based on the level of evaluation.

In the information provision device according to another aspect, a giver of the given gift may be further associated in the evaluation information, and when the giver of the given gift indicated by the evaluation information is different from the next giver, the estimation unit may sort the given gift as the low priority item regardless of the evaluation of the given gift indicated by the evaluation information. In this manner, by lowering the priority of presentation of the items that have been already given by other users, the probability that the next giver selects an item which the recipient has not yet been given increases.

In the information provision device according to another aspect, a giver of the given gift may be further associated in the evaluation information, and the estimation unit may sort the given gift where the evaluation value is equal to or more than the threshold and the giver indicated by the evaluation information is different from the next giver as the high priority item, and sort the other given gifts as the low priority item. In this manner, when the evaluation of the item that has been already given by another user is high, the item is preferentially presented to the next giver, and therefore the probability that the next giver selects the item which the recipient likes increases.

In the information provision device according to another aspect, when all of evaluation values corresponding to one given gift are equal to or more than the threshold, the estimation unit sorts the given gift as the high priority item. In this manner, by preferentially presenting the item that has always received a high evaluation to the next giver, the probability that the next giver selects the item which the recipient is pleased every time receiving it increases.

In the information provision device according to another aspect, the presentation unit may transmit the candidate information of the high priority item to the giver terminal without transmitting the candidate information of the low priority item. It is thereby possible to present only the items that meet a certain standard as candidates for a gift to the next giver.

In the information provision device according to another aspect, the presentation unit may set a lower search score to the low priority item than to the high priority item and transmit the candidate information of both of the high priority item and the low priority item to the giver terminal. In this manner, by presenting the items that do not meet a certain standard also to the next giver, the user can select a gift by referring to information of those items as well.

In the information provision device according to another aspect, the evaluation information may contain a giving quantity of the given gift, the estimation unit may set a purchase quantity larger than the giving quantity for each of the high priority item, and the presentation unit may transmit candidate information containing the purchase quantity set by the estimation unit to the giver terminal. It is thereby possible to suggest the next giver to give a larger quantity than the other users for the item which the recipient likes.

In the information provision device according to another aspect, the evaluation interface may be an interface for the recipient to evaluate both of the given gift and other items different from the given gift, the evaluation information may further contain evaluations of the other items, and the estimation unit may further estimate candidate items for the next gift from the other items based on the evaluations of the other items indicated by the evaluation information. In this manner, by obtaining evaluations of items other than the gift from the recipient and estimating candidates for a gift from the items other than the gifts as well based on the evaluations, the probability that the next giver selects the item which the recipient wishes increases.

In the information provision device according to another aspect, the other items may be items in the same item category as the given gift. In this case, the probability that the next giver selects an item in the same category as the item which the recipient likes increases.

In the information provision device according to another aspect, the other items may be items in different item categories from the given gift. In this case, the probability that the next giver selects an item in a different category which the recipient likes increases.

In the information provision device according to another aspect, the evaluation interface may be an interface for the recipient to evaluate both of the given gift and specified related items of the given gift, the evaluation registration unit may determine a degree of association as an evaluation value of a combination of the given gift and the related item based on evaluations entered through the evaluation interface, and store association degree information where the recipient and the degree of association are in association with each other into an association degree storage unit, and the estimation unit may further estimate candidate items for the next gift from the related items based on the degree of association indicated by the association degree information. In this manner, by obtaining evaluations of items related to the gifts that have been given in the past from the recipient and estimating candidates for a gift from the related items as well based on the evaluations, the probability that the next giver selects the item which the recipient wishes increases.

In the information provision device according to another aspect, the evaluation request unit may receive a request signal containing URL provided on a slip related to the given gift given by the recipient from the recipient terminal and transmit the evaluation interface in response to the request signal. In this manner, by providing the URL of the evaluation interface on a slip to be passed to the recipient, it is possible to guarantee that the recipient makes an evaluation after receiving the gift.

Advantageous Effects of Invention

According to one aspect of the present invention, it is possible to let a giver select a gift that pleases a recipient.

BRIEF DESCRIPTION OF DRAWINGS

FIG. 2 is a diagram showing an example of item information.

FIG. 3 is a diagram showing an example of user information.

FIG. 4 is a diagram showing an example of gift information.

FIG. 5 is a diagram showing an example of association degree information.

FIGS. 9(a) and 9(b) are diagrams showing examples of an evaluation page.

FIG. 13 is a diagram showing an example of an evaluation page.

DESCRIPTION OF EMBODIMENTS

Figure 1:
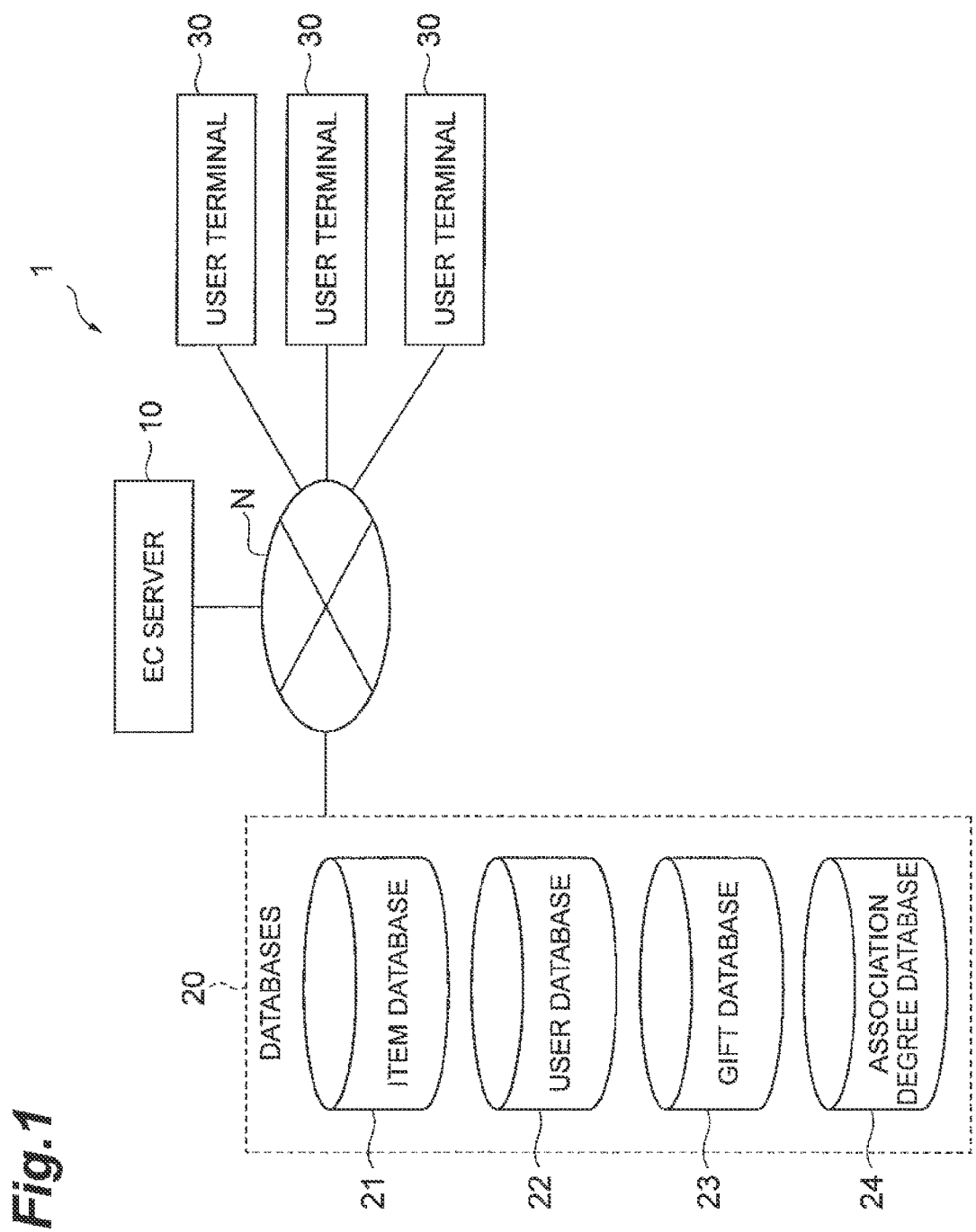
FIG. 1 is a diagram showing an overall configuration of an EC system according to an embodiment.

An embodiment of the present invention is described hereinafter in detail with reference to the appended drawings. In this embodiment, an information provision device according to the present invention is applied to an electronic commerce server (EC server). Note that, in the description of the drawings, the same or equivalent elements are denoted by the same reference symbols, and the redundant explanation thereof is omitted.

First, an EC server 10 according to an embodiment is described with reference to FIGS. 1 to 13. The EC server 10 is one component of an electronic commerce system (EC system) 1 that executes various kinds of processing related to a website (EC site) of a virtual shopping mall. In the EC system 1, a user (consumer) searches for an item and performs a purchase procedure through the EC site. A shop registers items to be sold with the virtual shopping mall and delivers an item purchased by a user to the user. Note that the type of an item is not particularly limited, and it may be a given tangible item or an intangible item such as a service. The EC system 1 includes databases (storage unit) 20 and user terminals 30 in addition to the EC server 10 having the item search function. Those devices are connected with one another through a communication network N.

A user performs an item search in the EC site using the user terminal 30 and thereby obtains information of a desired item. The user views the item information and, if likes it, performs a purchase procedure in the site and thereby obtains the item. The user can give an item to another person by setting the delivery address of the item to the person's address, not the user's own address, in the purchase procedure. In this specification, the item that is delivered to a person different from a purchaser by a purchase procedure in the EC site is referred to also as a gift.

The EC server 10 is a computer system that executes provision of various web pages (for example, a main page, an item page, a shop page etc.) in the EC site, item search, purchase processing (including stock update, payment, granting points to a user etc.) and the like in response to a request from the user terminal 30.

The databases 20 are a group of various types of databases required in the EC system 1.

The user terminal 30 is a computer owned by a user (consumer). The variety of the user terminal 30 is not particularly limited, and it may be a stationary or portable personal computer, or a mobile terminal such as an advanced mobile phone (smart phone), a cellular phone or a personal digital assistant (PDA), for example. The number of user terminals 30 in the EC system 1 is not limited. A user can be a gift giver or a gift recipient.

On the basis of the above assumption, the EC server 10 is described hereinafter in detail. First, various databases that are accessed by the EC server 10 are described in detail.

An item database 21 is a device that stores item information related to items that are sold by a virtual shop in the EC site. The item information contains a shop ID that uniquely identifies a virtual shop, an item ID that uniquely identifies an item, and attribute information of the item. The attribute information contains an item name, a price, image data, the quantity of stock, a category and URL of an item page, though the attribute information is not limited thereto. The item information is newly registered, updated or deleted based on an instruction transmitted from a shop terminal (not shown).

FIG. 2 shows an example of the item information. In this example, "item A" with the item ID "T001", "item B" with the item ID "T002" and the like are associated with a shop with the shop ID "S001".

A user database 22 is a device that stores user information. As shown in FIG. 3, the user information contains a user ID that uniquely identifies a user and attribute information of the user. The attribute information contains a user name, address, telephone number, email address and the like, though the attribute information is not limited thereto. The user database 22 stores not only EC site member information but also user information of gift givers or gift recipients, who are non-members. The user information of the non-member is registered by the EC server 10 based on information of a purchaser or a delivery address at the completion of purchase processing.

A gift database (evaluation storage unit) 23 is a device that stores gift information (evaluation information). The gift information is information indicating the record of purchase of a gift and an evaluation of the gift by a recipient. The gift information contains a purchase ID, a giver ID, a recipient ID, purchase date and time, a gift ID, a purchase quantity, and an evaluation. The purchase ID is an identifier that uniquely identifies each purchase procedure, and a new code is assigned as the purchase ID each time a purchase procedure is executed in the EC server 10. The giver ID is a user ID of a gift giver, and the recipient ID is a user ID of a gift recipient. The gift ID is an item ID of a gift that is given. Because a plurality of types of items can be presented in one purchase procedure, the gift information of one record can contain information (gift ID, purchase quantity and evaluation) about a plurality of items.

The gift information is newly registered in the gift database 23 at the time when the EC server 10 completes purchase processing, and an evaluation field is blank (NULL) in this point of time. After that, when a recipient enters and registers an evaluation of a gift through the user terminal 30, the EC server 10 overwrites the corresponding gift information with the evaluation.

FIG. 4 shows an example of the gift information. It is shown in this figure that a giver "U002" has given two items "T101" and "T103" to a recipient "U102", for example.

An association degree database (association degree storage unit) 24 is a device that stores association degree information. The association degree information is information indicating the strength of association (the degree of association) between items which is set for each recipient, and it contains a user ID, a combination of items, and the degree of association. A combination of items and an initial value of the degree of association are preset, and when new user information is registered in the user database, the association degree information corresponding to the user information is registered in the association degree database 24. Although a combination of items is represented by a combination of item types as shown in FIG. 5 in this embodiment, it may be represented by a combination of item IDs, a combination of item categories and the like.

The degree of association is an index that reflects a user's evaluation or taste about a combination of items, and therefore it can be regarded as an evaluation value of the combination. For example, as for a combination of beer and peanuts, the degree of association of a user who likes peanuts to eat with beer is higher than the degree of association of a user who does not like peanuts to eat with beer.

FIG. 5 shows an example of the association degree information. Because the association degree information is personalized information as described above, even if a combination of items is the same, the degree of association corresponding to the combination can vary from user to user. In the example of FIG. 5, while the degree of association about a combination of beer and peanuts is 0.7 for the user "U001", it is 0.3 for the user "U002". Note that, although the degree of association is set in the range from 0 to 1 and the initial value is 0.5 in this embodiment, the way of representing the degree of association and the initial value may be set arbitrarily.

Note that the structures of the above-described databases (records) are not limited to those shown in FIGS. 2 to 5, and the databases may be normalized or made redundant by an arbitrary policy.

Note that, although the databases 20 can include another database such as a shop database that stores shop information about virtual shops, such a database that is not directly related to provision of candidates for a gift in this embodiment is not described in detail.

Figure 6:
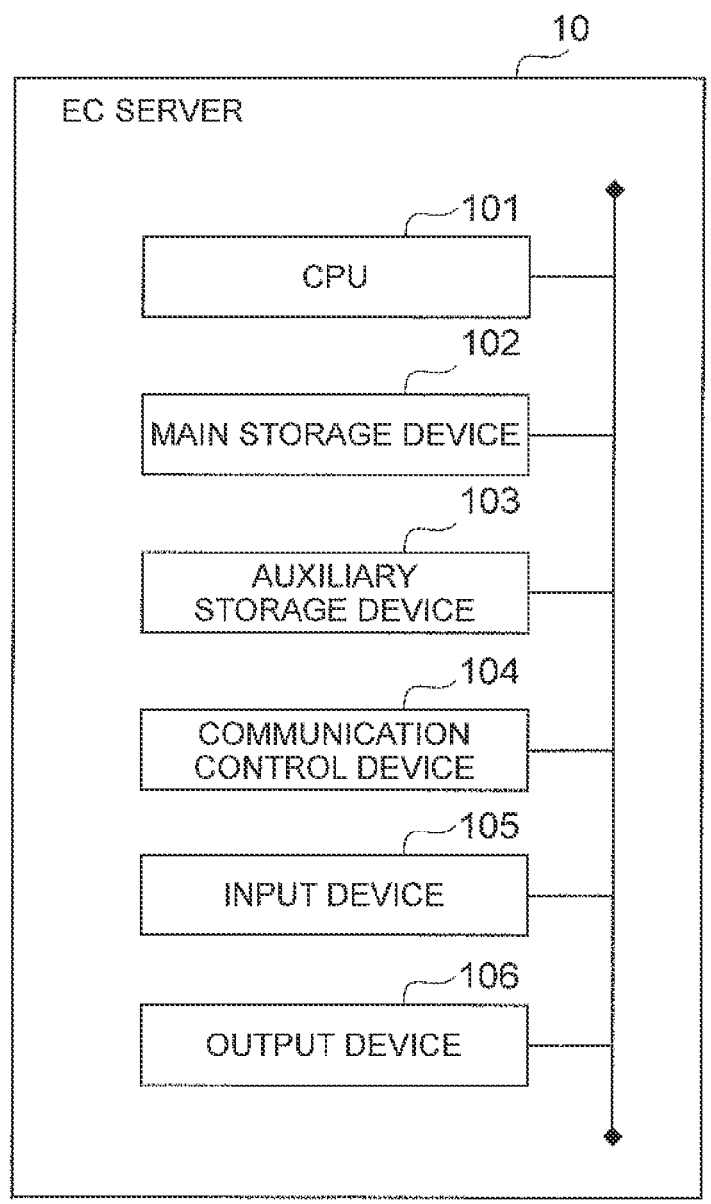
FIG. 6 is a diagram showing a hardware configuration of an EC server according to the embodiment.

The functions and configuration of the EC server 10 are described hereinbelow. FIG. 6 shows a hardware configuration of the EC server 10. As shown therein, the EC server 10 is composed of a CPU 101 that executes an operating system, an application program and the like, a main storage unit 102 such as ROM and RAM, an auxiliary storage unit 103 such as a hard disk, a communication control unit 104 such as a network card, an input device 105 such as a keyboard and a mouse, and an output device 106 such as a display.

The functional components of the EC server 10 described later are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103. Note that, although the EC server 10 is composed of one computer in the example of FIG. 6, the functions of the EC server 10 may be distributed among a plurality of computers.

Figure 7:
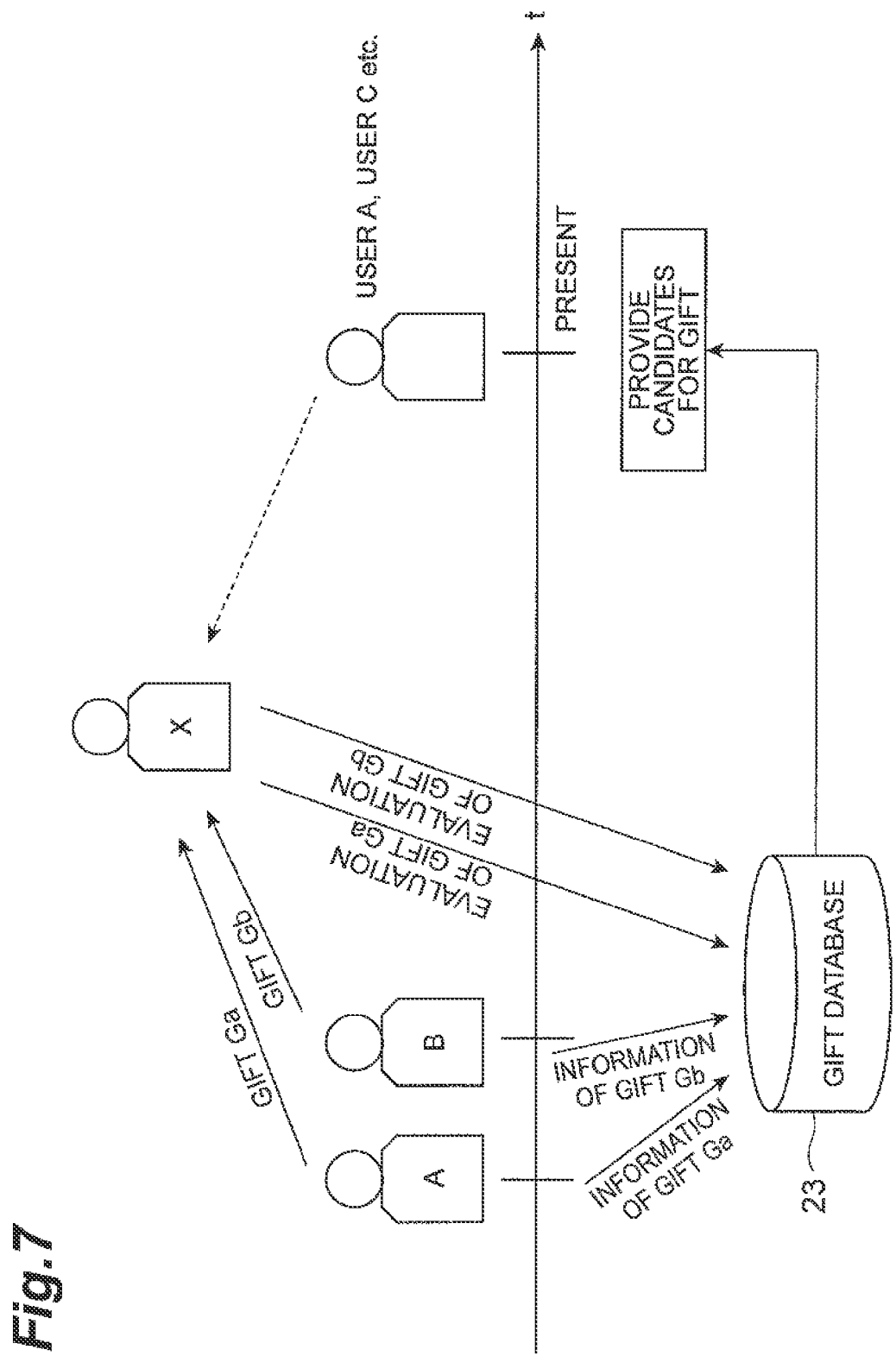
FIG. 7 is a diagram showing a concept of presentation of gift candidates in the embodiment.

In this embodiment, when a purchaser (next giver) who intends to give an item to another person performs a purchase procedure, the EC server 10 provides information of items which are likely to be favored by a recipient to the purchaser. As shown in FIG. 7, the EC server 10 registers gift information to the gift database 23 when a user purchases a gift to another person and adds an evaluation by a recipient of the gift to the gift information. After that, when a new purchaser who is a next giver accesses the EC site to give a gift to the same recipient, the EC server 10 estimates candidates for a gift based on the gift information to which the evaluation has been added and provides the candidates to the new purchaser.

In FIG. 7, users A and B have given gifts Ga and Gb, respectively, to a user X, and the user X has evaluated each of the gifts. Then, when a new purchaser (next giver) intends to give a next gift to the user X, the EC server 10 estimates and presents candidates for a gift based on the past gifts Ga and Gb. Note that the new purchaser may be a user who has given a gift to the user X or a user who has not yet given a gift to the user X.

Figure 8:
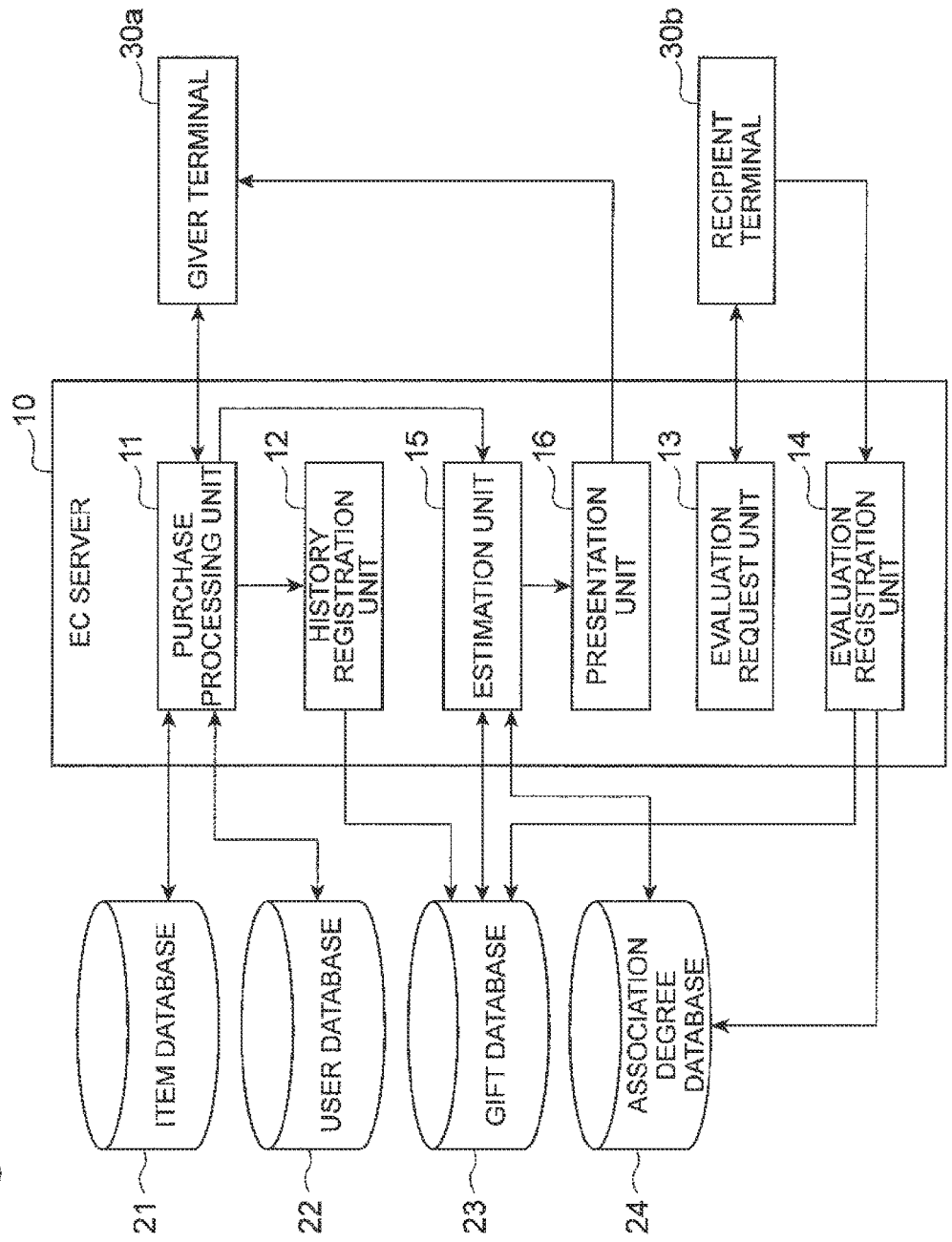
FIG. 8 is a block diagram showing a functional configuration of the EC server according to the embodiment.

In order to implement such recommendation, the EC server 10 includes, as functional components, a purchase processing unit 11, a history registration unit 12, an evaluation request unit 13, an evaluation registration unit 14, an estimation unit 15, and a presentation unit 16. FIG. 8 shows those functional components. Hereinafter, a user terminal of a next giver and a user terminal of a recipient are distinguished from each other as a giver terminal 30a and a recipient terminal 30b, respectively.

The purchase processing unit 11 is a functional component that executes a purchase procedure in the EC site. The purchase processing unit 11 creates a web page related to a purchase procedure in response to an HTTP (Hypertext Transfer Protocol) request received from the giver terminal 30a and transmits the web page as an HTTP response to the giver terminal 30a. The web pages created by the purchase processing unit 11 includes an item list page showing an item search result, an item page on which a specific item is shown, a procedure page to enter a payment method, a delivery method, a delivery address and the like, an order page to confirm the entered information and place an order and the like. Note that, however, the web page created by the purchase processing unit 11 is not limited thereto, and the page may be set arbitrarily according to the way the purchase procedure is done. The purchase processing unit 11 refers to the item database 21 or the user database 22 according to need when creating the web page.

The history registration unit 12 is a functional component that registers a record of a gift purchase procedure executed by the purchase processing unit 11 as gift information.

Upon completion of a purchase procedure by the purchase processing unit 11, the history registration unit 12 acquires information of a purchaser, a delivery address and a purchased item related to the procedure from the purchase processing unit 11. Next, the history registration unit 12 specifies a giver ID based on the purchaser information and specifies a recipient ID based on the delivery address information. If a user ID of the purchaser or the delivery address is already obtained at the time of the purchase procedure, the history registration unit 12 may use the user ID as the giver ID or the recipient ID. If, on the other hand, the user ID is unknown at the time of the purchase procedure, the history registration unit 12 acquires the user ID by referring to the user database 22 based on personal information (address, telephone number, email address etc.) of the purchaser or the delivery address. When the user information of the purchaser or the delivery address is not registered in the user database 22, the history registration unit 12 generates a user ID and generates and registers user information and then use the user ID as the giver ID or the recipient ID.

Further, the history registration unit 12 acquires an item ID indicating a purchased item and a purchase quantity of each item. Those data have been obtained at the time of the purchase procedure, and therefore the history registration unit 12 can use the data acquired from the purchase processing unit 11.

Then, the history registration unit 12 associates a newly generated purchase ID, the giver ID, the recipient ID, purchase date and time acquired from a system time and a set of one or more item ID and a purchase quantity with one another and thereby generates a record of gift information. The history registration unit 12 then stores the generated record into the gift database 23. At this time, an evaluation field of the record is blank (NULL).

The evaluation request unit 13 is a functional component that transmits an evaluation page for a recipient to evaluate a gift (given gift) from a giver to the recipient terminal 30*b*.

When a purchase procedure by the purchase processing unit 11 ends, a virtual shop manager makes arrangements for the item (gift) and delivers it to the delivery address. The recipient receives the gift and then accesses the evaluation page in the EC site through the recipient terminal 30*b*. The evaluation page is an evaluation interface for entering and registering an evaluation of a gift, and a purchase ID for identifying a record of access information is embedded in this web page.

The way of accessing the evaluation page may be set arbitrarily. In the case where the scheduled delivery date is specified in the purchase procedure, on the condition that the scheduled delivery date is recorded as a part of the gift information, the evaluation request unit 13 may send the URL of the evaluation page to the recipient when a specified time (for example, one day) has elapsed from the scheduled date.

For example, the evaluation request unit 13 refers to the user database 22 and specifies the email address of the recipient and transmits an email where the URL of the evaluation page is written to the email address. In this case, the recipient clicks on the URL and accesses the evaluation page. Specifically, the recipient terminal 30*b* transmits an HTTP request containing the URL to the EC server 10, and the evaluation request unit 13 creates an evaluation page in response to the request signal and transmits the page to the recipient terminal 30*b* as an HTTP response. By using the email in this manner, the recipient can easily access the evaluation page.

Alternatively, access to the evaluation page may be provided to the recipient by printing the URL of the evaluation page in the form of text or barcode (for example, two-dimensional barcode) on a slip (for example, invoice) of the item to be passed to the recipient. In this case, the slip on which the URL is provided is issued by the EC server 10 or the shop terminal (not shown) accessible to the server. When the recipient scans the two-dimensional barcode on the slip using the recipient terminal 30*b* or entering the URL on the recipient terminal 30*b*, the recipient terminal 30*b* transmits an HTTP request containing the URL to the EC server 10. The evaluation request unit 13 creates an evaluation page in response to the request and transmits the page to the recipient terminal 30*b* as an HTTP response. In this case, the recipient can access the evaluation page only after the gift is delivered, and it is thereby possible to guarantee that an evaluation is made after the item is received.

Figure 10:
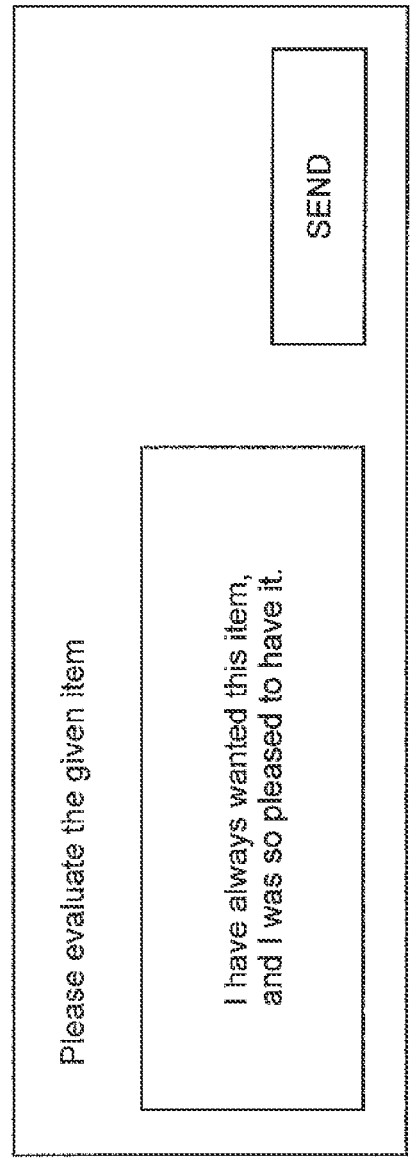
FIG. 10 is a diagram showing an example of an evaluation page.

The structure of an evaluation page and a method of evaluating a gift are not also limited. For example, the evaluation request unit 13 may create an evaluation page where an evaluation of a gift can be specified by values in several levels. FIG. 9(*a*) shows an evaluation page where an evaluation is represented in binary values (good/bad), and FIG. 9(*b*) shows an evaluation page to enter a five-level evaluation. Alternatively, the evaluation request unit 13 may create an evaluation page where comments can be freely made as shown in FIG. 10.

Figure 11:
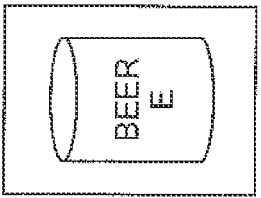
FIG. 11 is a diagram showing an example of an evaluation page.

Alternatively, the evaluation request unit 13 may create an evaluation page where not only a gift but also other items in the same category as the gift are shown to let a recipient compare those items. The evaluation page aims to inquire the recipient whether there has been another item the recipient has wished in the category to which the gift belongs. FIG. 11 shows an example of such an evaluation page. In this example, a beer A that has been given to a recipient as a gift and beers B to E of other brands are shown, and the recipient can select an item the recipient has actually wished using a checkbox below each item image.

Figure 12:
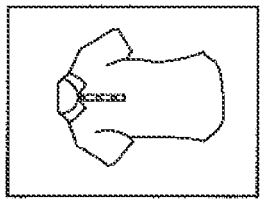
FIG. 12 is a diagram showing an example of an evaluation page.

Alternatively, the evaluation request unit 13 may create an evaluation page where not only a gift but also other items in different categories from the gift are shown to let a recipient compare those items. The evaluation page aims to inquire the recipient whether the recipient has wished an item in another category. FIG. 12 shows an example of such an evaluation page. In this example, a beer that has been given to a recipient as a gift and items (detergent, book, portable terminal, clothes) in different categories from the beer are shown. The recipient can select an item the recipient has actually wished using a checkbox below each item image. In the example of FIG. 12, the evaluation request unit 13 may show only categories rather than showing other items in other categories and, in this case, a recipient selects an item category actually wished.

In any of the cases of FIGS. 11 and 12, if a checkbox for a gift is marked, it can be estimated that the user likes the gift, and if not, it can be estimated that the user has wished another item different from the gift.

Alternatively, the evaluation request unit 13 may create an evaluation page where the evaluations of both a gift and related items can be entered as shown in FIG. 13. In the example of FIG. 13, a recipient can specify whether the gift (in this example, beer) is good or bad and select an item the recipient has wished among related items (in this example, cheese, peanuts and chocolate) using a checkbox. The evaluation request unit 13 determines related items to be displayed together with a gift according to a combination of items defined in the association degree information.

The evaluation registration unit 14 is a functional component that stores an evaluation entered through the evaluation page into the gift database 23. In some cases, the evaluation registration unit 14 updates the degree of association in the association degree database 24. When a recipient enters the evaluation of a gift in the evaluation page and clicks on a Send button, the recipient terminal 30b transmits data of the evaluation together with the purchase ID to the EC server 10. The evaluation registration unit 14 receives the purchase ID and the evaluation data and then updates the access information corresponding to the purchase ID. In the case where the evaluation is entered in the evaluation page shown in FIG. 13, the evaluation registration unit 14 further updates the degree of association in the association degree information where a pair of the user ID and the item ID corresponds to a pair of the recipient and the item on which an evaluation has been made.

In the case where the evaluation is entered as shown in FIG. 9, the evaluation registration unit 14 writes an evaluation value in the evaluation field in the access information. For example, the evaluation registration unit 14 may write either 1 (good) or 0 (bad) or write any integer from 1 to 5.

In the case where comments are entered as shown in FIG. 10, the evaluation registration unit 14 writes the text data into the evaluation field in the access information.

In the case where the evaluation is entered as shown in FIG. 11 or 12, the evaluation data contains the evaluation value of the gift and one or more pairs of the item ID and the evaluation value of another item. In this case, the evaluation registration unit 14 writes the evaluation value of both of the gift and another item in the evaluation field in the access information. In the example of FIG. 12, when a category, not a specific item in another category, is shown, the evaluation registration unit 14 writes the evaluation value for that category.

In the case where the evaluation is entered as shown in FIG. 13, the evaluation registration unit 14 writes the evaluation value of the gift in the evaluation field in the access information and further updates the degree of association in the association degree information. It is assumed that the evaluation of each of the gift and the related item is represented by either 1 (good) or 0 (bad) as shown in FIG. 13, and a combination of the evaluation value Ra of the gift and the evaluation value Rb of one certain related item (or a category of a related item) is represented by (Ra, Rb). In this case, when the combination is (1, 1) (that is, when the evaluations of the both items are both "good"), the evaluation registration unit 14 increases the corresponding degree of association by a specified value (for example, 0.1). On the other hand, when the combination is (1, 0), (0,1) or (0,0), the evaluation registration unit 14 decreases the degree of association by a specified value (for example, 0.1). The relationship between the evaluations of a gift and a related item and the variation in the degree of association is not limited to this example and may be set arbitrarily.

The estimation unit 15 is a functional component that, while the purchase processing unit 11 executes a purchase procedure corresponding to giving a gift, estimates candidates for a gift to be presented to a user who performs the procedure. This user is a person who can be a next gift purchaser, and the user is referred to as a "next giver" in this specification.

First, the estimation unit 15 acquires a user ID recorded in HTTP Cookie or a user ID corresponding to purchaser information entered in a web page related to a purchase procedure and thereby specifies the next giver.

Next, the estimation unit 15 specifies a gift recipient. The estimation unit 15 may acquire a recipient ID by referring to the user database 22 based on data of a delivery address entered in the web page transmitted from the purchase processing unit 11 to the giver terminal 30a. In this case, the estimation unit 15 receives data of the delivery address from the purchase processing unit 11. Alternatively, the estimation unit 15 may specify candidates for a recipient from gift information where a giver ID indicates the next giver and the purchase date corresponds to the current date. For example, the estimation unit 15 may specify the ID of the recipient to whom the next giver has given a gift in the past time corresponding to the current date (for example, the past month or season corresponding to the current date).

Then, the estimation unit 15 reads the gift information corresponding to the specified recipient, which is the gift information indicating that the past givers have given gifts to the recipient, from the gift database 23 and estimates candidates for a gift based on the gift information. The estimation unit 15 can estimate candidates for a gift using various methods as described below.

[First Method]

The estimation unit 15 may determine the evaluation value of each gift based on the read gift information and set the gifts where the evaluation value is a specified threshold or more as high priority items and set the gifts where the evaluation value is less than the threshold as low priority items. The high priority item is an item to be presented (recommended) as a gift to the next giver in preference to the low priority item. By such sorting, it is possible to recommend the items with relatively high evaluations to the next giver in preference to other items.

In the case where there are a plurality of evaluations for one gift, the estimation unit 15 may use a statistic (for example, average) of the evaluations as a final evaluation value. Further, when the evaluation is text data, the estimation unit 15 may determine the evaluation value of the gift based on words in the comments. For example, the estimation unit 15 may set an evaluation value Ea when a positive word for the gift (for example, "good" etc.) is contained and set an evaluation value Eb lower than the value Ea when a negative value for the gift (for example, "has not wanted" etc.) is contained.

The threshold may be set arbitrarily, and the threshold may be 0.7 when the evaluation value is two-level evaluation of 1 or 0, and the threshold may be 4 when the evaluation value is five-level evaluation from 1 to 5, for example.

[Second Method]

As an alternative example of the first example, the estimation unit 15 may set the gifts which other persons (other givers) different from the next giver have given to the recipient in the past as low priority items regardless of the evaluation values of the gifts. In this manner, by lowering the priority of presentation of the items that have been already given by other users, the probability that the next giver selects an item which the recipient has not yet been given increases.

[Third Method]

The estimation unit 15 may set the gift where the giver ID indicates another giver and the evaluation value is a specified threshold or more as a high priority item and set the other gifts as low priority items. In this manner, when the evaluation of the item that has been already given by another user is high, the item is preferentially presented to the next giver, and therefore the probability that the next giver selects the item which the recipient likes increases.

[Fourth Method]

The estimation unit 15 may specify the item which the recipient has received a plurality of times during a specified period (for example, during the last one year, during the last half year, in all records etc.) based on the read gift information, and set the gift where the evaluation value of each time is always a specified threshold or more as a high priority item and set the other gifts as low priority items. By preferentially presenting the item that has received a high evaluation many times, the probability that the next giver selects the item which the recipient is pleased every time receiving it increases.

[Fifth Method]

The estimation unit 15 may determine the evaluation value of each gift based on the read gift information and set the gifts where the evaluation value is a specified threshold or more as high priority items. Next, the estimation unit 15 specifies the greatest value of the quantity given by other givers for each of the high priority items. Then, the estimation unit 15 sets the purchase quantity (giving quantity) of the high priority item recommended to the next giver to a larger value than the greatest value. In this case, it is possible to suggest the next giver to give a larger quantity than the other users for the item which the recipient likes.

[Sixth Method]

The estimation unit 15 may sort the past gifts into high priority items and low priority items by any of the above first to fifth methods and then further extract related items that are good with the high priority items for the recipient. The estimation unit 15 reads the association degree information that corresponds to the recipient ID and the extracted high priority item and where the degree of association is a specified threshold (for example, 0.7) or higher and thereby extracts a related item (or a related item type or category) of the high priority item also as the high priority item. In this manner, by estimating not only the gifts with high evaluations but also related items that are good with the high priority items for the recipient, the probability that the next giver selects the item which the recipient likes increases.

[Seventh Method]

In the case where the evaluations of items other than a gift are obtained as shown in the example of FIGS. 11 and 12, the estimation unit 15 may sort the past gifts into high priority items and low priority items by any of the above first to fifth methods and further sort the other items into high priority items and low priority items. The estimation unit 15 can sort items other than a gift into high priority items and low priority items by using the above first method. In this manner, by estimating candidates for a gift also from the items other than the gift, the probability that the next giver selects the item which the recipient wishes increases. For example, the probability that the next giver selects an item in the same category as the item which the recipient likes or an item in a different category which the recipient likes increases.

After specifying the high priority items and the low priority items by any of the above methods, the estimation unit 15 outputs the processing result to the presentation unit 16. Note that, in the above method, if there is no need to check the giver ID of the gift information, the giver ID may be not contained in the gift information in the gift database 23.

The presentation unit 16 is a functional component that transmits candidate information indicating the items estimated by the estimation unit 15 to the giver terminal 30a and thereby presents the items to the next giver. The presentation unit 16 may read the item information of only the high priority items from the item database 21 and transmit the item information as the candidate information to the giver terminal 30a. In this case, only the items that meet a certain standard are presented to the next giver as candidates for a gift. Alternatively, the presentation unit 16 may set an item search score (the order of display) so that the high priority items are displayed in higher ranks than the low priority items and then transmit the item information of those two types of items as the candidate information to the giver terminal 30a. In this case, the next giver can select a gift by referring to the items with low evaluations from the recipient as well.

The candidate information is displayed on the giver terminal 30a in the way that it is embedded in a web page related to the purchase procedure or displayed in a different window from that web page. For example, when the next giver intends to give a gift to the recipient X, the names and images of the items as gift candidates indicated by the candidate information are displayed together with the message "Gift ideas for Mr./Ms. X". In the item name or item image, the function such as a link to the item page or addition to a shopping cart may be embedded. In this case, the next giver can see the details of the item or add the item to the shopping cart as a gift by clicking on the item name or the item image.

In the case where the estimation unit 15 estimates a recipient, the candidate information contains that information as well. In this case, candidates for a recipient are displayed on the giver terminal 30a, and the next giver can specify one recipient from those candidates. When the recipient is specified, the high priority items corresponding to the recipient are displayed on the screen (in some cases, the low priority items are also displayed). In the case where the estimation unit 15 has used the fifth method described above, the candidate information contains the recommended giving quantity as well, and thereby the next giver can obtain information about the quantity as well.

The operation of the EC server 10 is described, and further an information provision method according to this embodiment is described hereinafter with reference to FIGS. 14 and 15. In the following description, evaluation registration processing and gift candidates presentation processing are described separately.

Figure 14:
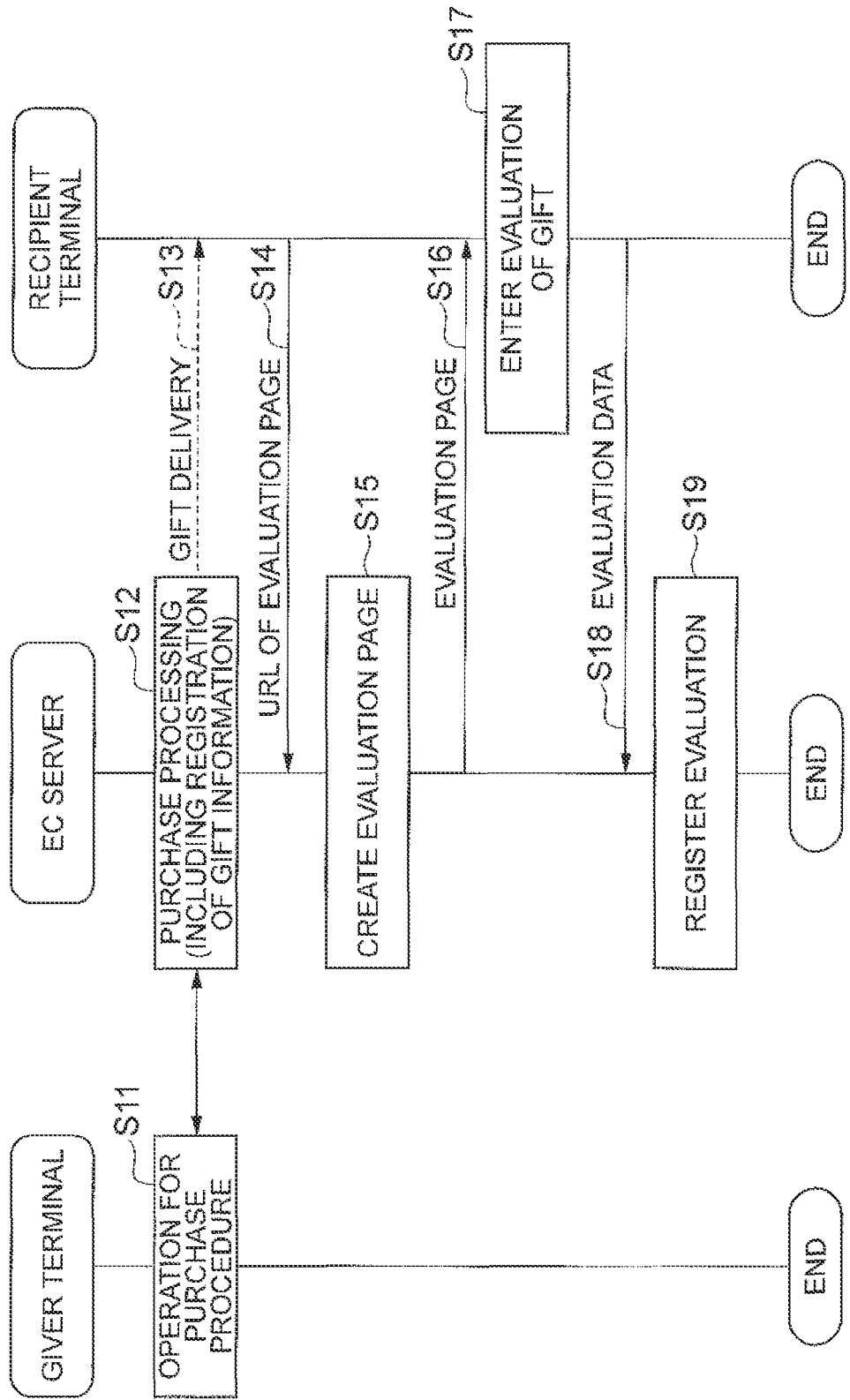
FIG. 14 is a sequence chart showing evaluation registration processing by the EC server shown in FIG. 1.

The registration of evaluations is performed as shown in FIG. 14. In accordance with the operation of the purchase procedure in the giver terminal 30a (Step S11), in the EC server 10, the purchase processing unit 11 executes purchase processing including registration of gift information (Step S12). In Step S12, the history registration unit 12 generates gift information and stores it into the gift database 23. When the purchase processing ends, the purchased item is delivered as a gift to a recipient (Step S13).

After that, the recipient accesses the evaluation page using the recipient terminal 30b. At this time, the recipient terminal 30b transmits an HTTP request containing the URL of the evaluation page to the EC server 10 (Step S14), and the evaluation request unit 13 creates an evaluation page in response to the request and transmits it to the recipient terminal 30b (Steps S15 and S16, evaluation request step).

When the recipient enters the evaluation of the gift in the evaluation page displayed on the recipient terminal 30b (Step S17), the recipient terminal 30b transmits data of the entered evaluation to the EC server 10 (Step S18). Then, the evaluation registration unit 14 registers the evaluation into gift information based on the evaluation data and, in some cases, updates association degree information as well (Step S19, evaluation registration step).

The above process shown in FIG. 14 is executed each time a user performs a procedure of purchasing an item and giving it to another person and, as a result, gift information in which evaluations are registered is accumulated in the gift database 23.

Figure 15:
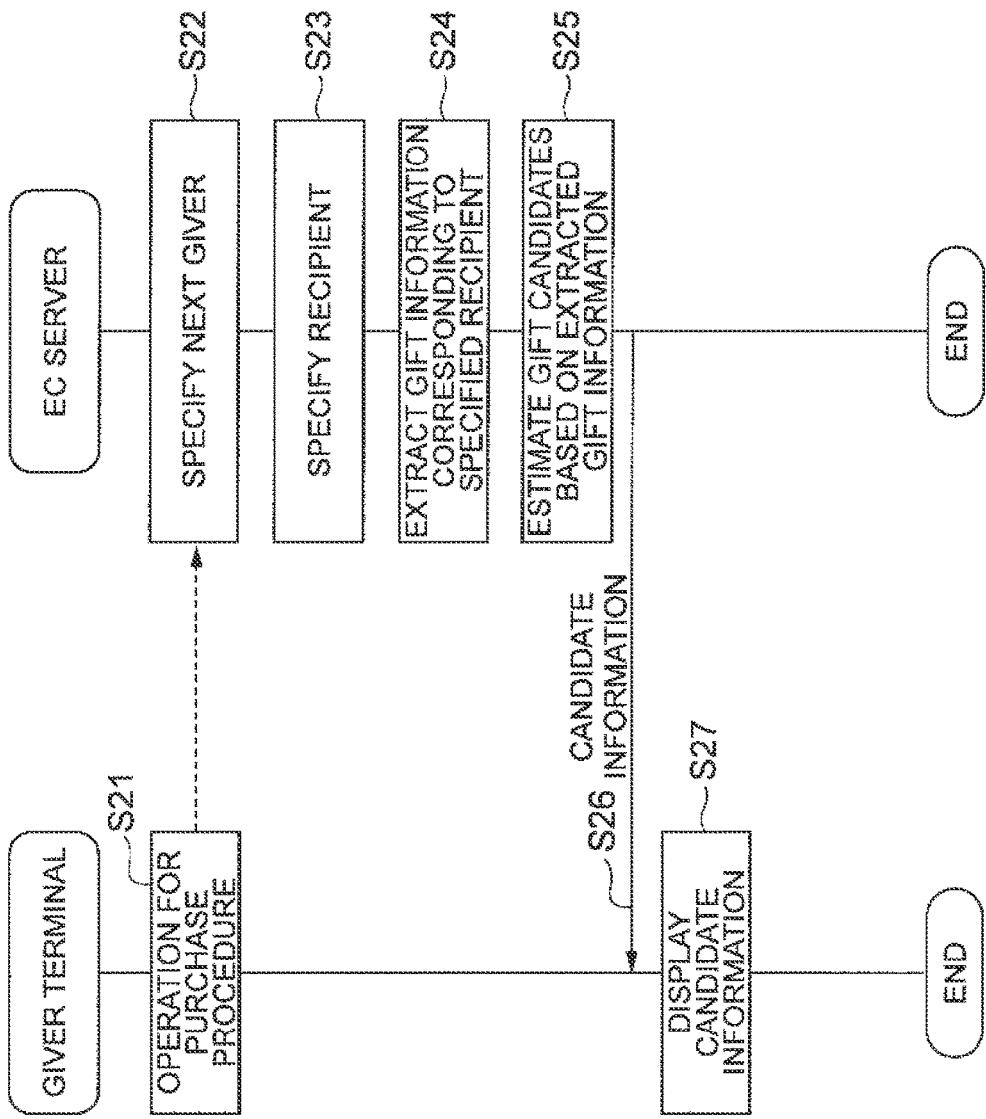
FIG. 15 is a sequence chart showing gift candidate presentation processing by the EC server shown in FIG. 1.

Presentation of gift candidates based on accumulated evaluations is performed as shown in FIG. 15. While the purchase processing is executed by the operation of the purchase procedure in the giver terminal 30a (Step S21), the estimation unit 15 in the EC server 10 specifies the next giver (Step S22) and further specifies the recipient (Step S23). Then, the estimation unit 15 extracts gift information corresponding to the specified recipient from the gift database 23 (Step S24), and estimates candidates for a gift based on the gift information (Step S25). Steps S22 to S25 correspond to the estimation steps, and the estimation unit 15 can estimate candidates for a gift by the above-described various methods in Step S25.

After that, the presentation unit 16 transmits candidate information indicating the estimated gift candidate items to the giver terminal 30a (Step S26, presentation step), and the giver terminal 30a displays the candidate information on the monitor (Step S27). The next giver can select an item to be given to the recipient by referring to the information.

Figure 16:
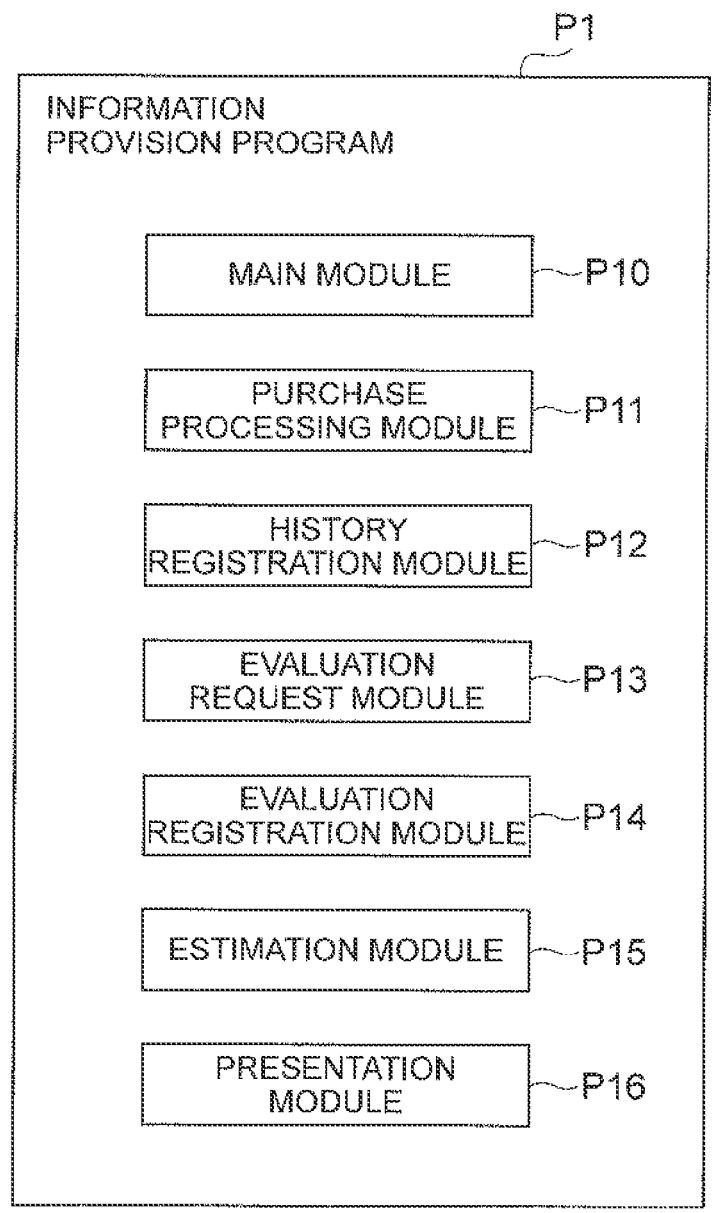
FIG. 16 is a diagram showing a configuration of an information provision program according to the embodiment.

Hereinafter, an information provision program P1 that causes a computer to function as the EC server 10 is described with reference to FIG. 16.

The information provision program P1 includes a main module P10, a purchase processing module P11, a history registration module P12, an evaluation request module P13, an evaluation registration module P14, an estimation module P15 and a presentation module P16.

The main module P10 is a part that exercises control over the purchase processing and information provision functions. The functions implemented by executing the purchase processing module P11, the history registration module P12, the evaluation request module P13, the evaluation registration module P14, the estimation module P15 and the presentation module P16 are equal to the functions of the purchase processing unit 11, the history registration unit 12, the evaluation request unit 13, the evaluation registration unit 14, the estimation unit 15 and the presentation unit 16 described above, respectively.

The information provision program P1 is provided in the form of being recorded in a static manner on a tangible recording medium such as CD-ROM or DVD-ROM or semiconductor memory, for example. Further, the information provision program P1 may be provided as a data signal superimposed onto a carrier wave through a communication network.

As described above, according to this embodiment, when gift giving is done, a recipient evaluates the gift, and the evaluation is recorded as evaluation information. After that, when the next giver intends to give a new gift (next gift) to the same recipient, candidate items for a new gift are estimated from the gifts that have been given in the past (given gift) based on the evaluation, and the items are presented to the giver. In this manner, by estimating gift candidates based on the evaluations of gifts by the recipient, the probability that the next giver selects a gift which the recipient likes increases. Further, because the evaluation information corresponds to the gift that has been actually given, gift candidates are estimated based on reliable information without depending on the personal information of the recipient. It is thereby possible to more reliably allow the giver to select a gift which the recipient likes and enhance the degree of satisfaction of the recipient.

Further, because candidates for a gift are presented automatically while a purchase procedure is performed by the next giver, the candidates for a gift can be presented without need for explicit transition of a request (for example, a request for item search) from the giver terminal 30a. It is thereby possible to reduce the network traffic or processing time caused by the request.

Further, in this embodiment, the gifts that have been given in the past are sorted into a group of items that have received evaluations of a certain standard or higher (high priority items) and a group including items that do not meet the standard (low priority items), and it is thereby possible to present candidates for a gift based on the level of evaluation.

Embodiments of the present invention are described in detail above. However, the present invention is not limited to the above-described embodiments. Various changes and modifications may be made to the present invention without departing from the scope of the invention.

REFERENCE SIGNS LIST

1 . . . EC system, 10 . . . EC server (information provision device), 11 . . . purchase processing unit, 12 . . . history registration unit, 13 . . . evaluation request unit, 14 . . . evaluation registration unit, 15 . . . estimation unit, 16 . . . presentation unit, 20 . . . databases, 21 . . . item database, 22 . . . user database, 23 . . . gift database (evaluation storage unit), 24 . . . association degree database (association degree storage unit), 30 . . . user terminal, 30a . . . giver terminal, 30b . . . recipient terminal, P1 . . . information provision program, P10 . . . main module, P11 . . . purchase processing module, P12 . . . history registration module, P13 . . . evaluation request module, P14 . . . evaluation registration module, P15 . . . estimation module, P16 . . . presentation module

The invention claimed is:

1. An information provision device comprising:
at least one memory operable to store program code;
at least one processor operable to read the program code and operate as instructed by the program code, the program code including:
code configured to cause the at least one processor to store, in an evaluation storage, evaluation information containing a purchase ID, a giver ID, a recipient ID, a gift ID, and an evaluation of a given gift, in association with one another, wherein the purchase ID is an identifier that uniquely identifies each purchase procedure, and the evaluation information is newly registered in the evaluation information when a purchase procedure is completed, an evaluation field of the newly registered evaluation information being blank (NULL);
code configured to cause the at least one processor to transmit, to a recipient terminal, a URL of a web page including a graphical user interface to evaluate the given gift given to a recipient;
evaluation request code configured to cause the at least one processor to transmit in response to a request signal containing the URL, the web page including the graphical user interface to the recipient terminal to evaluate the given gift given to the recipient, wherein a purchase identifier (ID) that identifies a record of access information is embedded in the web page;
evaluation registration code configured to cause the at least one processor to store an evaluation entered through the graphical user interface into the evaluation storage, by overwriting the evaluation field of corresponding evaluation information with the entered evaluation;

estimation code configured to cause the at least one processor to, in response to a next giver giving a next gift to the recipient through a giver terminal, automatically specify the recipient indicated by the evaluation information corresponding to the next giver, without receiving an input by the next giver, and then estimate candidate items for the next gift at least from given gifts based on evaluations indicated by the evaluation information corresponding to the recipient; and presentation code configured to cause the at least one processor to automatically transmit candidate information indicating the estimated candidate items to the giver terminal and present the candidate items to the next giver, wherein the estimation code causes the at least one processor to sort one or more given gifts into a high priority item and a low priority item at least based on an evaluation value obtained from the evaluation, wherein the given gift sorted as the high priority item satisfies a condition that the evaluation value is equal to or more than a threshold, and the given gift sorted as the low priority item includes a gift where the evaluation value is less than the threshold, wherein the presentation code causes the at least one processor to transmit the candidate information of the high priority item to the giver terminal without transmitting the candidate information of the low priority item.

2. The information provision device according to claim 1, wherein a giver of the given gift is further associated in the evaluation information, and when the giver of the given gift indicated by the evaluation information is different from the next giver, the estimation code causes the at least one processor to sort the given gift as the low priority item regardless of the evaluation of the given gift indicated by the evaluation information.

3. The information provision device according to claim 1, wherein a giver of the given gift is further associated in the evaluation information, and the estimation code causes the at least one processor to sort the given gift where the evaluation value is equal to or more than the threshold and the giver indicated by the evaluation information is different from the next giver as the high priority item, and sort the other given gifts as the low priority item.

4. The information provision device according to claim 3, wherein when all of evaluation values corresponding to one given gift are equal to or more than the threshold, the estimation code causes the at least one processor to sort the given gift as the high priority item.

5. The information provision device according to claim 1, wherein the evaluation information contains a giving quantity of the given gift, the estimation code causes the at least one processor to set a purchase quantity larger than the giving quantity for each of the high priority item, and the presentation code causes the at least one processor to transmit candidate information containing the set purchase quantity to the giver terminal.

6. The information provision device according to claim 1, wherein the evaluation request code causes the at least one processor to receive a request signal containing URL provided on a slip related to the given gift given by the recipient from the recipient terminal and transmit the graphical user interface in response to the request signal.

7. The information provision device according to claim 1, wherein the graphical user interface is an interface for the recipient to evaluate both of the given gift and specified related items of the given gift, wherein the evaluation registration code causes the at least one processor to determine a degree of association as an evaluation value of a combination of the given gift and the related item based on evaluations entered through the graphical user interface, and store association degree information where the recipient and the degree of association are in association with each other into an association degree storage, and the estimation code causes the at least one processor to estimate candidate items for the next gift further based on the related items based on the degree of association indicated by the association degree information.

8. The information provision device according to claim 7, wherein the related items are items in the same item category as the given gift.

9. The information provision device according to claim 7, wherein the related items are items in different item categories from the given gift.

10. An information provision method executed by an information provision device, the method comprising:

storing, in an evaluation storage, evaluation information containing a purchase ID, a giver ID, a recipient ID, a gift ID, and an evaluation of a given gift, in association with one another, wherein the purchase ID is an identifier that uniquely identifies each purchase procedure, and the evaluation information is newly registered in the evaluation information when a purchase procedure is completed, an evaluation field of the newly registered evaluation information being blank (NULL);

transmitting, to a recipient terminal, a URL of a web page including a graphical user interface to evaluate the given gift given to a recipient;

transmitting, in response to a request signal containing the URL, the web page including the graphical user interface to the recipient terminal to evaluate the given gift given to the recipient, wherein a purchase identifier (ID) that identifies a record of access information is embedded in the web page;

storing an evaluation entered through the graphical user interface into the evaluation storage, by overwriting the evaluation field of corresponding evaluation information with the entered evaluation;

in response to a next giver giving a next gift to the recipient through a giver terminal, automatically specifying the recipient indicated by the evaluation information corresponding to the next giver, without receiving an input by the next giver, and then estimating candidate items for the next gift at least from given gifts based on evaluations indicated by the evaluation information corresponding to the recipient; and automatically transmitting candidate information indicating the estimated candidate items to the giver terminal and presenting the candidate items to the next giver, wherein the estimating comprises sorting one or more given gifts into a high priority item and a low priority item at least based on an evaluation value obtained from the evaluation, wherein the given gift sorted as the high priority item satisfies a condition that the evaluation value is equal to or more than a threshold, and the given gift sorted as the low priority item includes a gift where the evaluation value is less than the threshold, wherein the automatically transmitting comprises transmitting the candidate information of the high priority item to the giver terminal without transmitting the candidate information of the low priority item.

11. A non-transitory computer-readable recording medium storing an information provision program causing a computer to implement:

storing, in an evaluation storage, evaluation information containing a purchase ID, a giver ID, a recipient ID, a gift ID, and an evaluation of a given gift, in association with one another, wherein the purchase ID is an identifier that uniquely identifies each purchase procedure, and the evaluation information is newly registered in the evaluation information when a purchase procedure is completed, an evaluation field of the newly registered evaluation information being blank (NULL);

transmitting, to a recipient terminal, a URL of a web page including a graphical user interface to evaluate the given gift given to a recipient;

transmitting, in response to a request signal containing the URL, the web page including the graphical user interface to the recipient terminal to evaluate the given gift given to the recipient, wherein a purchase identifier (ID) that identifies a record of access information is embedded in the web page;

storing an evaluation entered through the graphical user interface into the evaluation storage, by overwriting the evaluation field of corresponding evaluation information with the entered evaluation;

in response to a next giver giving a next gift to the recipient through a giver terminal, automatically specifying the recipient indicated by the evaluation information corresponding to the next giver, without receiving an input by the next giver, and estimating candidate items for the next gift at least from given gifts based on evaluations indicated by the evaluation information corresponding to the recipient; and automatically transmitting candidate information indicating the estimated candidate items to the giver terminal and present the candidate items to the next giver, wherein the estimating comprises sorting one or more given gifts into a high priority item and a low priority item at least based on an evaluation value obtained from the evaluation, wherein the given gift sorted as the high priority item satisfies a condition that the evaluation value is equal to or more than a threshold, and the given gift sorted as the low priority item includes a gift where the evaluation value is less than the threshold, wherein the automatically transmitting comprises transmitting the candidate information of the high priority item to the giver terminal without transmitting the candidate information of the low priority item.

* * * * *